US008547342B2

(12) United States Patent
Stallings et al.

(10) Patent No.: US 8,547,342 B2
(45) Date of Patent: Oct. 1, 2013

(54) GESTURE-BASED DELIVERY FROM MOBILE DEVICE

(75) Inventors: Heath Stallings, Colleyville, TX (US); Brian F. Roberts, Dallas, TX (US); Donald H. Relyea, Jr., Dallas, TX (US); Jeffrey Wayne Kurtti, Prosper, TX (US); Andrew McClain Allman, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 876 days.

(21) Appl. No.: 12/341,443

(22) Filed: Dec. 22, 2008

(65) Prior Publication Data

US 2010/0156812 A1  Jun. 24, 2010

(51) Int. Cl.
*G06F 3/041* (2006.01)
*G06F 3/048* (2006.01)

(52) U.S. Cl.
USPC .......................................... 345/173

(58) Field of Classification Search
None
See application file for complete search history.

(56) References Cited

U.S. PATENT DOCUMENTS

| 6,246,376 | B1 * | 6/2001 | Bork et al. ..................... 343/760 |
| 8,166,118 | B1 * | 4/2012 | Borghetti ...................... 709/206 |
| 2003/0098845 | A1 * | 5/2003 | Hanson et al. ................ 345/156 |
| 2006/0256008 | A1 * | 11/2006 | Rosenberg .................... 342/367 |
| 2007/0146347 | A1 * | 6/2007 | Rosenberg .................... 345/173 |
| 2008/0152263 | A1 * | 6/2008 | Harrison ....................... 382/313 |
| 2009/0040289 | A1 * | 2/2009 | Hetherington et al. ..... 348/14.12 |
| 2009/0054108 | A1 * | 2/2009 | Kito .............................. 455/566 |
| 2009/0244015 | A1 * | 10/2009 | Sengupta et al. ............. 345/173 |
| 2010/0083189 | A1 * | 4/2010 | Arlein et al. .................. 715/863 |

FOREIGN PATENT DOCUMENTS

JP     2008299619 A  *  12/2008

* cited by examiner

*Primary Examiner* — William J Klimowicz
*Assistant Examiner* — Mark Fischer

(57) ABSTRACT

A computing device displays an item on a display of the computing device and establishes a wireless connection with one or more other devices. The computing device receives an input gesture on a touch panel of the computing device, where the input gesture has a direction, and determines a geographic direction of the input gesture. The computing device also identifies one of the one or more other devices in the geographic direction and sends the item on the display to the one of the one or more devices in the geographic direction.

20 Claims, 15 Drawing Sheets

GESTURE-BASED DELIVERY FROM MOBILE DEVICE

BACKGROUND

Mobile devices (e.g., cell phones, personal digital assistants (PDAs), etc.) may support peer-to-peer file sharing which can allow for a convenient exchange of information between users of the mobile devices. Existing peer-to-peer exchanges may require a sending user to identify a recipient by expressly entering or selecting an indicator (e.g., name, unique ID number, etc.) of the recipient device before sending an item.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide gesture-based item delivery for devices within a local wireless network, such as, for example, an ad hoc network using wireless protocols. Touch gestures (e.g., a "flick") on the surface of a mobile device equipped with a touch-sensitive panel may be used to initiate sending an item from a sending mobile device to another mobile device or to a fixed-location (e.g., stationary) recipient device.

Figure 1A:
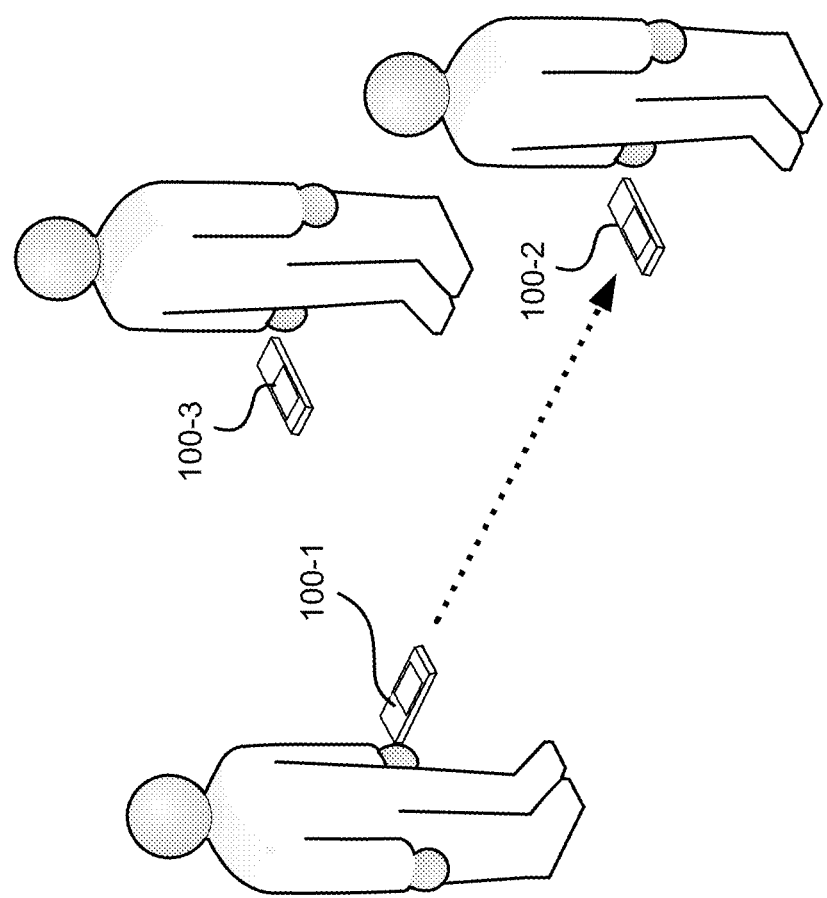
FIGS. 1A and 1B are diagrams illustrating exemplary implementations of the concepts described herein.
Figure 1B:
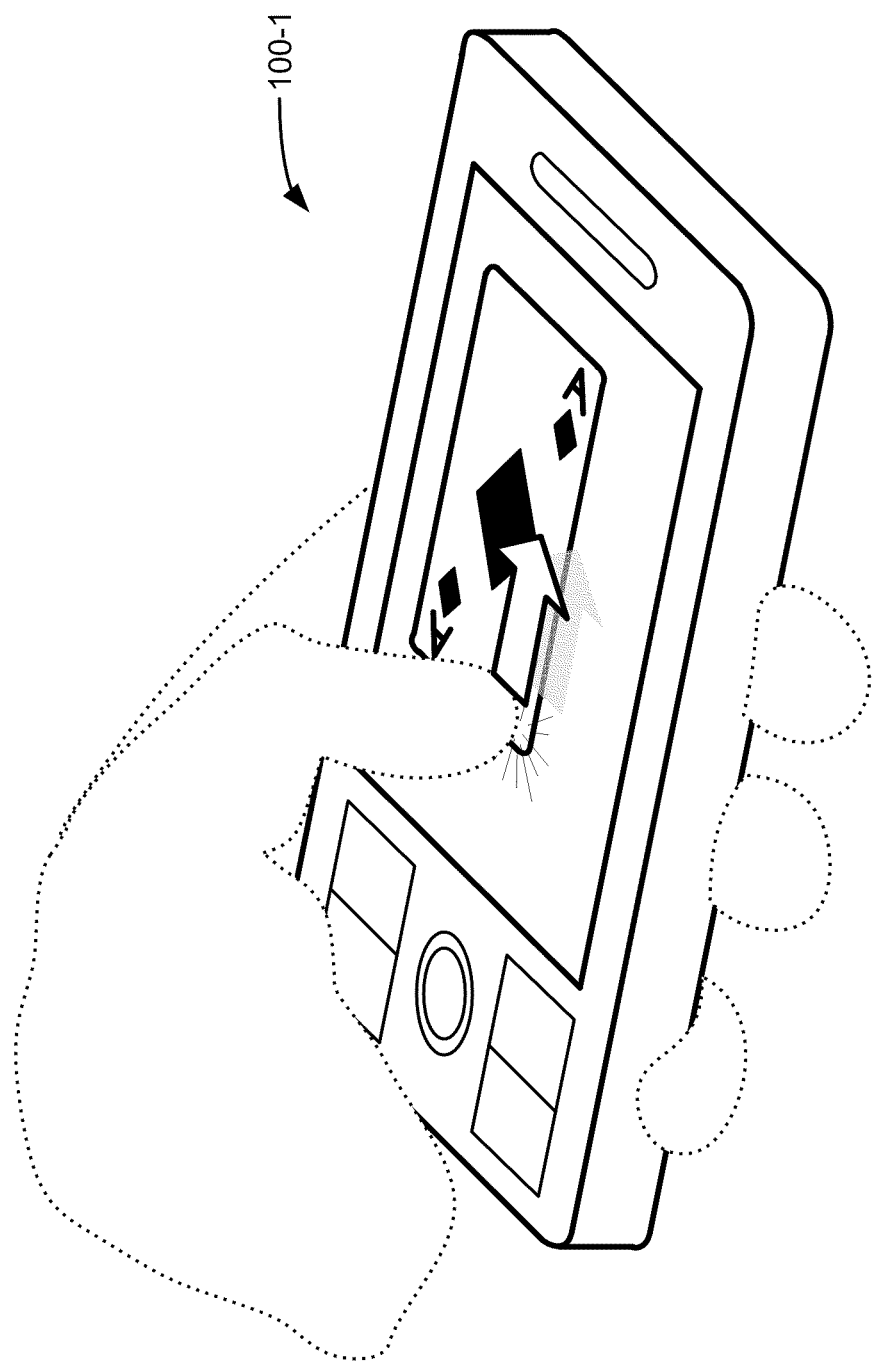

FIGS. 1A and 1B provide diagrams illustrating exemplary implementations of the concepts described herein. Three mobile devices 100-1, 100-2, and 100-3 (herein referred to collectively as "devices 100," and singularly as "device 100") are shown in FIG. 1A. Users of devices 100 may be within close proximity and may desire to transfer items (e.g., objects, data, images, audio, video, links, text, copies of files, etc.) from one mobile device (e.g., mobile device 100-1) to another mobile device (e.g., mobile device 100-2). Each of mobile devices 100 may be equipped with a local wireless network technology that can enable the item transfer. Rather than specifically identifying a particular recipient's mobile device 100-2 (e.g., entering a name/identifier or selecting one from a list), a user of sending mobile device 100-1 may simply use a touch gesture (e.g., sliding a touch in a direction along the surface of a touch-sensitive panel), as shown in FIG. 1B. As described further herein, sending mobile device 100-1 may identify its own location/orientation to determine the geographic direction of the touch gesture. The sending mobile device 110 may then obtain location information from other nearby mobile devices 100-2 and 100-3 to differentiate the intended recipient's mobile device 100-2 from an unintended recipient's mobile device 100-3.

As used herein, the terms "user," "sender," and "recipient" are intended to be broadly interpreted to include a mobile communication device or a user of a mobile communication device. As used herein, the term "item" may include any computer-readable file that may be transferred over a network, such as objects, data, images, audio, video, text, copies of files, and/or links to files accessible via one or more networks.

Figure 2:
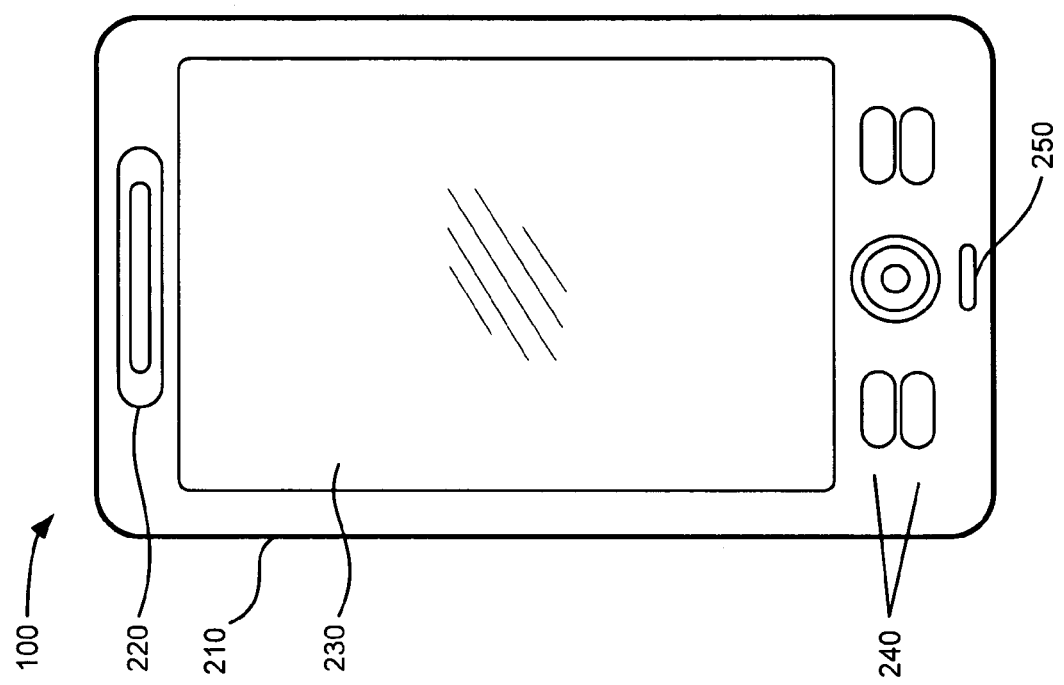
FIG. 2 depicts a diagram of an exemplary device in which systems and/or methods described herein may be implemented.

FIG. 2 is a diagram of an exemplary device 100 in which systems and/or methods described herein may be implemented. Device 100 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a remote control (e.g., for a television), a portable gaming system, a global positioning system (GPS) device, a printer, a facsimile machine, a pager, a camera (e.g., a digital camera), a video camera (e.g., a camcorder), a calculator, binoculars, a telescope, a personal computer, a laptop computer, any other device capable of utilizing a touch-panel that can identify directional movement of a touch, a thread or process running on one of these devices, and/or an object executed by one of these devices.

As illustrated in FIG. 2, device 100 may include a housing 210, a speaker 220, a display 230, control buttons 240, and/or a microphone 250. Housing 210 may protect the components of device 100 from outside elements. Housing 210 may include a structure configured to hold devices and components used in device 100, and may be formed from a variety of materials. For example, housing 210 may be formed from plastic, metal, or a composite, and may be configured to support speaker 220, display 230, control buttons 240 and/or microphone 250.

Speaker 220 may provide audible information to a user of device 100. Speaker 220 may be located in an upper portion of device 100, and may function as an ear piece when a user is engaged in a communication session using device 100. Speaker 220 may also function as an output device for music and/or audio information associated with games and/or video images played on device 100.

Display 230 may provide visual information to the user. For example, display 230 may display text inputted into device 100, text, images, video, and/or graphics received from another device, and/or information regarding incoming or outgoing calls or text messages, emails, media, games, phone books, address books, the current time, etc. For example, screen 310 may include a liquid crystal display (LCD), such as a thin film transistor (TFT) LCD, etc.

In one implementation, display 230 may include a touch screen display that may be configured to receive a user input when the user touches (or comes in close proximity to) display 230. For example, the user may provide an input to display 230 directly, such as via the user's finger, or via other devices, such as a stylus. User inputs received via display 230 may be processed by components and/or devices operating in device 100. The touch-screen-enabled display 230 may permit the user to interact with device 100 in order to cause device 100 to perform one or more operations. Exemplary technologies to implement a touch screen on display 230 may include, for example, a near-field-sensitive (e.g., capacitive) overlay, an acoustically-sensitive (e.g., surface acoustic wave) overlay, a photo-sensitive (e.g., infra-red) overlay, a pressure sensitive (e.g., resistive and/or capacitive) overlay, and/or any other type of touch panel overlay that allows display 230 to be used as an input device. The touch-screen-enabled display 230 may also include the ability to identify movement of a body part or a pointing device as it moves on or near the surface of the touch-screen-enabled display 230.

Control buttons 240 may permit the user to interact with device 100 to cause device 100 to perform one or more operations. For example, control buttons 240 may be used to cause device 100 to transmit information. Microphone 250 may receive audible information from the user. For example, microphone 250 may receive audio signals from the user and may output electrical signals corresponding to the received audio signals.

Although FIG. 2 shows exemplary components of device 100, in other implementations, device 100 may contain fewer, different, differently arranged, or additional components than depicted in FIG. 2. For example, in some implementations device 100 may include a keypad, such as a standard telephone keypad, a QWERTY-like keypad (e.g., a traditional configuration of typewriter or computer keyboard keys), or another keypad layout. In still other implementations, a component of device 100 may perform one or more tasks described as being performed by another component of user device 100.

Figure 3:
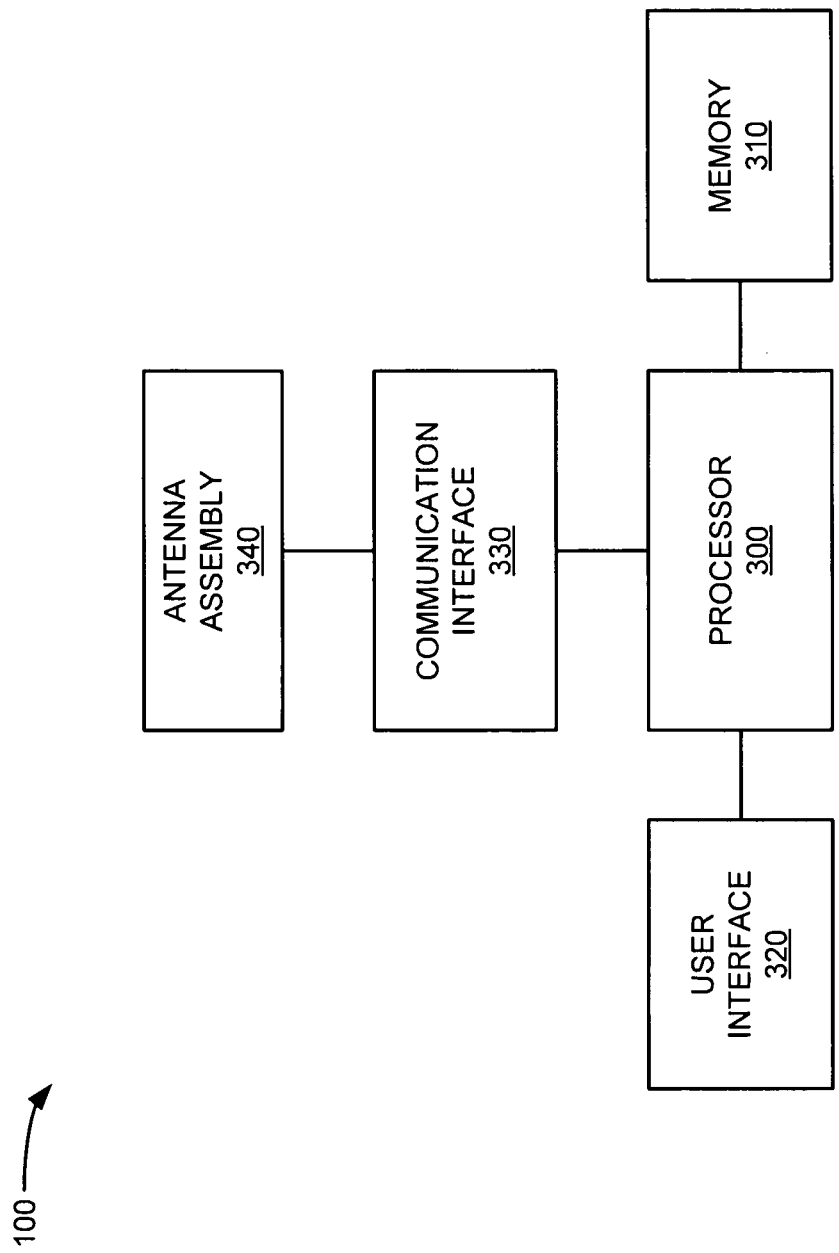
FIG. 3 depicts a diagram of exemplary components of the device illustrated in FIG. 2.

FIG. 3 is a diagram of exemplary components of device 100. As illustrated, device 100 may include a processor 300, a memory 310, a user interface 320, a communication interface 330, and/or an antenna assembly 340.

Processor 300 may include one or more microprocessors, application specific integrated circuits (ASICs), field programmable gate arrays (FPGAs), or the like. Processor 300 may control operation of device 100 and its components. In one implementation, processor 300 may control operation of components of device 100 in a manner described herein.

Memory 310 may include a random access memory (RAM), a read-only memory (ROM), and/or another type of memory to store data and instructions that may be used by processor 300. In one implementation, memory 310 may store data used to display a graphical user interface, such as quick-access menu arrangement 100 on display 230.

User interface 320 may include mechanisms for inputting information to device 100 and/or for outputting information from device 100. Examples of input and output mechanisms might include buttons (e.g., control buttons 240, keys of a keypad, a joystick, etc.); a speaker (e.g., speaker 220) to receive electrical signals and output audio signals; a microphone (e.g., microphone 250) to receive audio signals and output electrical signals; a display (e.g., display 230) to receive touch input and/or to output visual information (e.g., time-related items received by device 100); a vibrator to cause device 100 to vibrate; and/or a camera to receive video and/or images.

Communication interface 330 may include, for example, a transmitter that may convert baseband signals from processor 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As will be described in detail below, device 100 may perform certain operations described herein in response to processor 300 executing software instructions of an application contained in a computer-readable medium, such as memory 310. A computer-readable medium may be defined as a physical or logical memory device. A logical memory device may include a space within a single physical memory device or spread across multiple physical memory devices. The software instructions may be read into memory 310 from another computer-readable medium or from another device via communication interface 330. The software instructions contained in memory 310 may cause processor 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 100, in other implementations, device 100 may contain fewer, different, differently arranged, or additional components than depicted in FIG. 3. In still other implementations, a component of device 100 may perform one or more other tasks described as being performed by another component of device 100.

Figure 4:
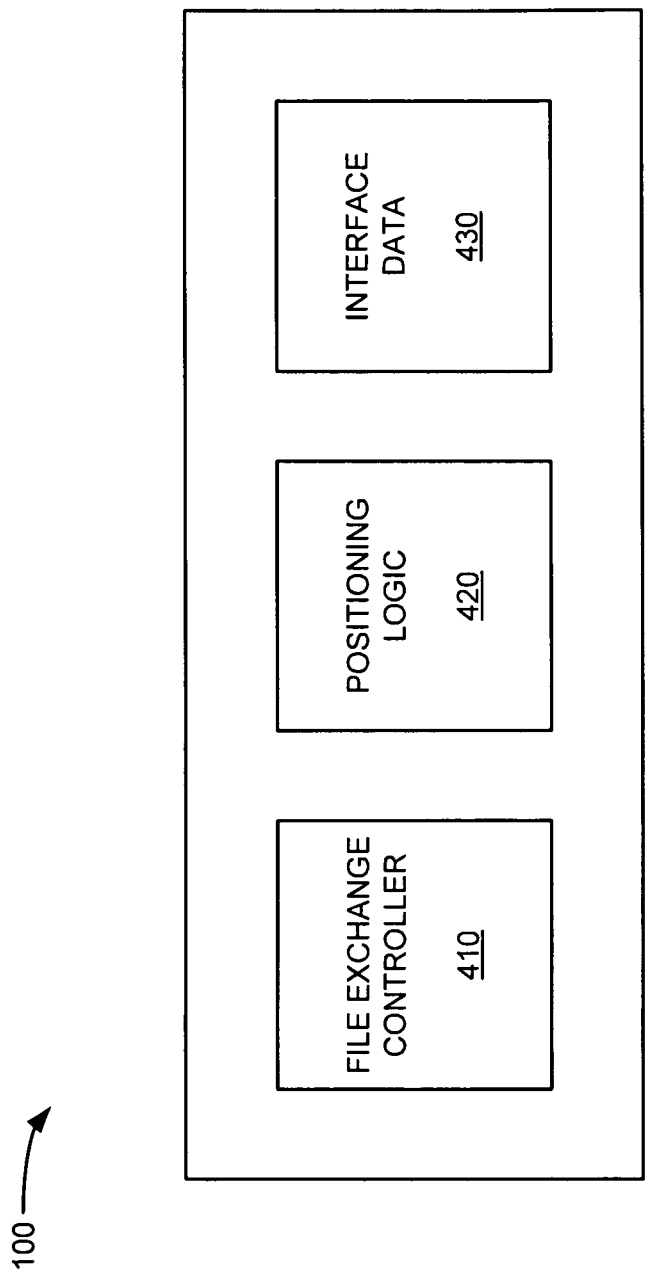
FIG. 4 depicts a diagram of exemplary functional components of the device illustrated in FIG. 2.

FIG. 4 provides a diagram of exemplary functional components of device 100. As shown in FIG. 4, device 100 may include a file exchange controller 410, positioning logic 420, and interface data 430. Device 100 may also include other peripheral applications (not shown) associated with one or more items to be sent/received using gesture-based item delivery. Peripheral applications may include, for example, a file manager application, a telephone application, a text-messaging application, an email application, an instant messaging (IM) application, a calendar application, a multimedia messaging service (MMS) application, a short message service (SMS) application, an image viewing application, a camera application, an organizer, a video player, an audio application, a GPS application, a game application, etc.

File exchange controller 410 may control operations to identify recipient devices and send items over the wireless network. For example, file exchange controller 410 may identify triggers to indicate when device 100 may toggle into or out of a gesture-based item delivery mode. File exchange controller 410 may also interpret gestures, such as sliding touch gestures or send gestures, for a gesture-based item delivery. File exchange controller 410 may also indicate items to a user that may be available to send via a gesture-based item delivery and may determine, based on the user input, a particular item to send in response to a send gesture. In one implementation, file exchange controller 410 may indicate items to a user by presenting overlays, indicators, or other icons in the vicinity of displayed items that can be sent via gesture-based item delivery.

When a recipient of gesture-based item delivery is identified, file exchange controller 410 may initiate sending of an item over a wireless network. In some implementations, file exchange controller 410 may also display confirmation windows to prompt user input regarding delivery of an item. In an exemplary implementation, file exchange controller 410 may retrieve display elements and/or graphics from interface data 430 to represent item exchange actions. For example, menus, confirmation windows, settings, transitions (e.g., item slides in or burns up), sounds, vibrations, etc. may be presented in response to particular actions associated with gesture-based item delivery. File exchange controller 410 may also log item delivery information to identify previous recipients and compile a list of potentially safe recipients. File exchange controller 410 may also retrieve user preferences from interface data 430 to apply, for example, security and privacy settings.

In another implementation, file exchange controller 410 may also provide receiving functions to accept items sent via gesture-based delivery. As a receiver, file exchange controller 410 may store a list of "safe" senders based on, for example, a user's contacts, previous item exchanges and/or user preferences. File exchange controller 410 may also generate user confirmation prompts and graphics relating to incoming items. File exchange controller 410 may also direct incoming items to default storage locations, accept user input to determine a storage location within a memory (e.g., memory 310), and/or subject incoming items to security measures, such as virus checking.

Positioning logic 420 may request, retrieve, store and/or analyze position information to facilitate gesture-based item delivery. Positioning logic 420 may communicate with a GPS component of device 100 to obtain geographic position information for device 100. Positioning logic 420 may also communicate with a gyroscope and/or accelerometer component of device 100 to obtain orientation information for device 100. In one implementation, positioning logic 420 may request orientation and location information for device 100 when device 100 is acting as a sending device (e.g., device 100-1). Positioning logic 420 may also request location information for other devices 100 (e.g., device 100-2, 100-3) when device 100 is acting as a sending device (e.g., device 100-1). When device 100 is acting as a non-sending device (e.g., device 100-2, 100-3), positioning logic 420 may provide location information for device for use by the sending device (e.g., 100-1). In another implementation, positioning logic 420 may store information for fixed-location devices that may receive gesture-based item delivery over a wireless network. In a particular implementation, positioning logic 420 may prompt a user to establish position information for a non-GPS-enabled fixed-location device using, for example, proximity readings from device 100. Based on position information of the sending device 100, positioning logic 420 may calculate a directional vector for a user's send gesture. Positioning logic 420 may also compare the vector to location information from other nearby devices 100 to determine the intended recipient device of a send gesture.

Interface data 430 may include information that may be used by file exchange controller 410 to conduct gesture-based item exchanges. Interface data 430 may include, for example, application icons, graphical overlays, menu triggers, window templates, and/or user preferences. User preferences may include, for example, security and privacy settings, notification settings, confirmation settings, and the like.

Although FIG. 4 shows exemplary functional components of device 100, in other implementations, device 100 may contain fewer, different, differently arranged, or additional functional components than depicted in FIG. 4. In still other implementations, a functional component of device 100 may perform one or more tasks described as being performed by another functional component of device 100.

Figure 5:
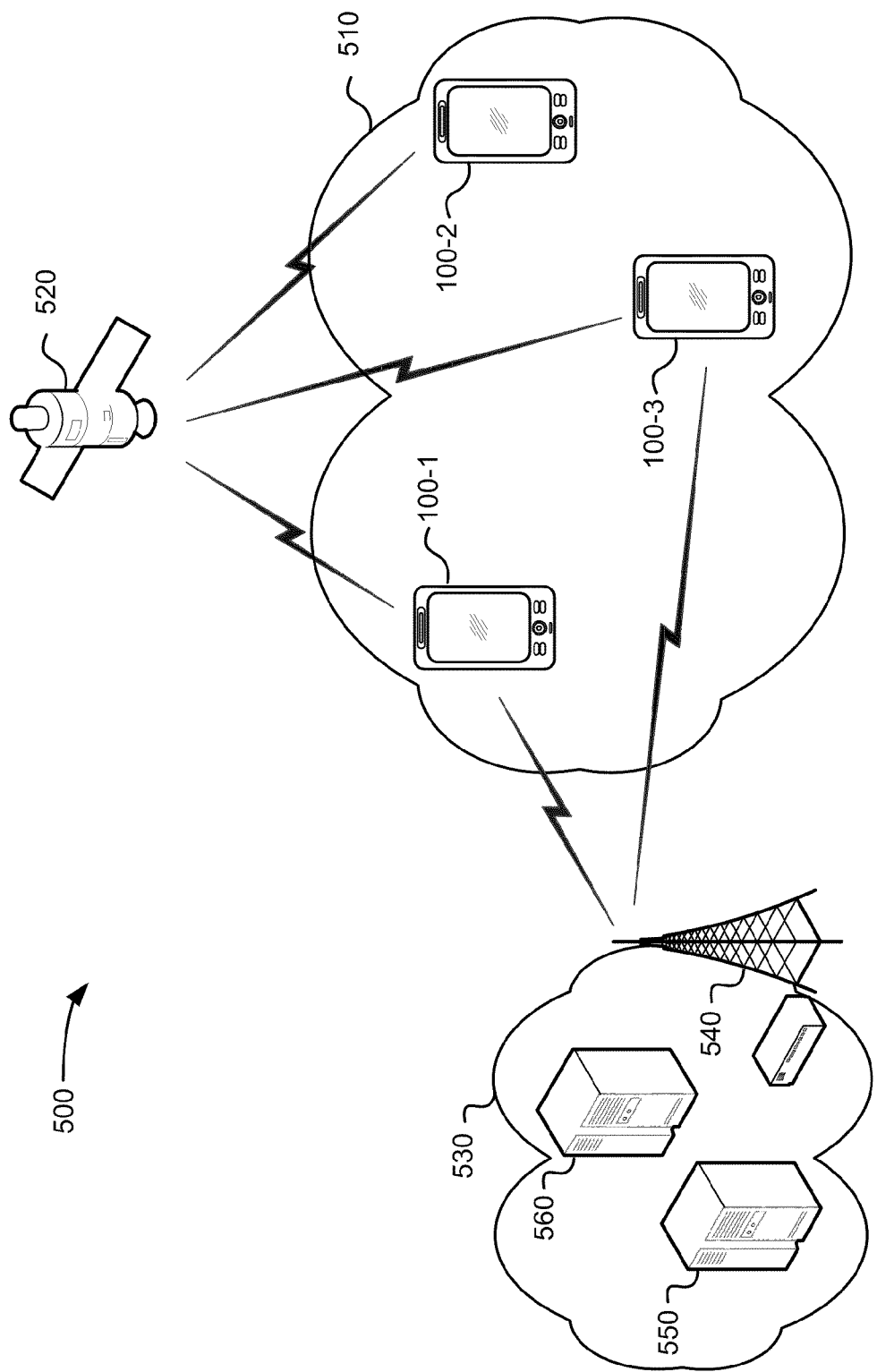
FIG. 5 depicts a diagram of an exemplary network environment in which systems and methods described herein may be implemented.

FIG. 5 depicts a diagram of an exemplary network environment 500 in which systems and methods described herein may be implemented. As shown, network environment 500 may include a group of devices 100 in communication with each other and/or other devices to form a wireless network 510. Each of devices 100 may also be in communication with one or more satellites 520 and a wireless carrier network 530.

Wireless network 510 may include a local network that interconnects wireless devices, such as devices 100, within their immediate proximity. These devices may be located nearby (e.g., from less than 1 meter to about 100 meters) and may frequently or occasionally come within range and go out of range of each other. For example, in one implementation, one device 100 may be paired with another device 100 over a short range wireless standard, such as Bluetooth™. Bluetooth™ is a known radio standard and communications protocol primarily designed for low power consumption over relatively short ranges. Bluetooth™-enabled devices can be configured to automatically discover and connect with other devices within range. The term "Bluetooth," as used herein, may refer to a standard for short range communication. Depending on context, Bluetooth™ may also refer to a Bluetooth™ device, a Bluetooth™ component, or a hardware and/or software interface that conforms to the Bluetooth™ standard.

In another implementation, network 510 may include another type of wireless local area network, such a network based on ultra wide band (e.g., bandwidth>500 MHz) communications. Examples of standards that are based on ultra wide band (UWB) may include wireless Universal Serial Bus (WUSB) and WiNet (Internet Protocol over UWB), as well as Bluetooth™ over ultra wide band. Examples of other standards related to UWB may include Multi-Band Orthogonal Frequency Division Multiplexing (MB-OFDM) and Direct Sequence UWB (DS-UWB).

In another implementation, wireless network 510 may include a wireless fidelity (WiFi) network or another type of wireless network that includes another device (e.g., a server and/or wireless router) to facilitate communication between devices 100. In implementations described herein, device 100 may automatically select a wireless network interface among different types of wireless network interfaces that are available on device 100 for transferring information. The device may select the wireless network interface based on a variety of factors, including, for example, the wireless network interface with the smallest power consumption. In another implementation, a user of device 100 may select the wireless network interface.

Satellite(s) 520 may be, for example, a GPS satellite or a satellite for a global navigation satellite system (GNSS). A device 100 may send a signal to satellite(s) 520 to request position information. Satellite(s) 520 may respond to the signal from device 100 by providing latitude and longitude coordinates indicating the position of device 100.

Wireless carrier network 530 may include a radio access network (RAN) 540, a position determining entity (PDE) 550, and a device location client (DLC) 560. Wireless carrier network 530 may connect a device 100 to a variety of provider services, including a location-based service infrastructure. RAN 540 may include a variety of components to facilitate mobile communications, such as antennas, base stations, mobile switching centers, and interfaces with Public Switched Telephone Networks (PSTNs) and/or packet data servicing nodes (PDSNs).

PDE 550 may include one or more components to determine the position of a device 100 and/or to help a device 100 determine its own position. PDE 550 may, for example, track the position of GPS satellite 520 through a network of stationary GPS receivers distributed across the coverage area of a wireless network. PDE 550 may, for example, determine an approximate location of a device 100 based on the signal from a local base station and provide device 100 with the identities and positions of GPS satellites that are likely to be in range of device 100. PDE 550 may support one or more position determining technologies or algorithms to gather location information.

Device location client (DLC) 560 may collect and provide real-time (or near real-time) location information for devices 100. As shown in the exemplary implementation of FIG. 5, DLC 560 may operate as separate component (e.g., a server) within wireless carrier network 530. In other implementations, DLC 560 may be implemented within devices within wireless network 510, such as one or more fixed-location devices 100 and/or a wireless network server. DLC 560 may, for example, receive location information from a particular sending device 100-1 about one or more fixed-location devices 100 and associate the information from the particular sending device 100-1 with the particular sending device 100-1 or with a group of associated sending devices 100-1 (e.g., mobile devices with the same billing account). DLC 560 may store information received from a device 100 and provide the information to an associated device 100 via a network connection. In a particular example, a user may identify location information for a set of fixed-location devices (e.g., a set-top box, a printer, and/or a network hub within a home) and have that information made available through DLC 560 to associated sending devices 100-1 without the associated sending devices 100-1 having to separately register the set of fixed location devices.

In another implementation, DLC 560 may provide a map or other representation that can be displayed on device 100. The map or other representation may provide an indication of the user's location with respect to other devices 100 within the area of the user (e.g., within local network 510 or within a particular distance).

In systems and/or methods described herein, devices 100 may establish wireless connections within wireless network 510. Each device 100 may determine its own position by communicating with one or more of satellite 520, RAN 530, PDE 550, DLC 560, and/or another device 100. As a sending device, each device 100 may also determine its own orientation/direction at the time of a gesture-based item delivery command. In one implementation, when one of devices 100 receives a send gesture, the sending device 100 may identify the location of the other devices in network 510 either through a real-time request or retrieval of periodically updated information. The sending device 100 may identify the geographic direction of the send gesture and identify the intended recipient device. The sending device 100 may then deliver the item to the receiving device using network 510.

Although the configuration of FIG. 5 shows exemplary components of network environment 500, in other implementations, fewer, different, differently arranged, or additional components may be used. In other implementations, features of certain components may be combined. For example, in one implementation, one or more functions of RAN 540, PDE 550, and/or DLC 560 may be combined. Conversely, a single component may be implemented as multiple, distributed components. For example, PDE 550 and or DLC 560 may be distributed components. Further, connections between the various components may be directly made or may be indirectly made via a node, a network, or a combination thereof.

Figure 6A:
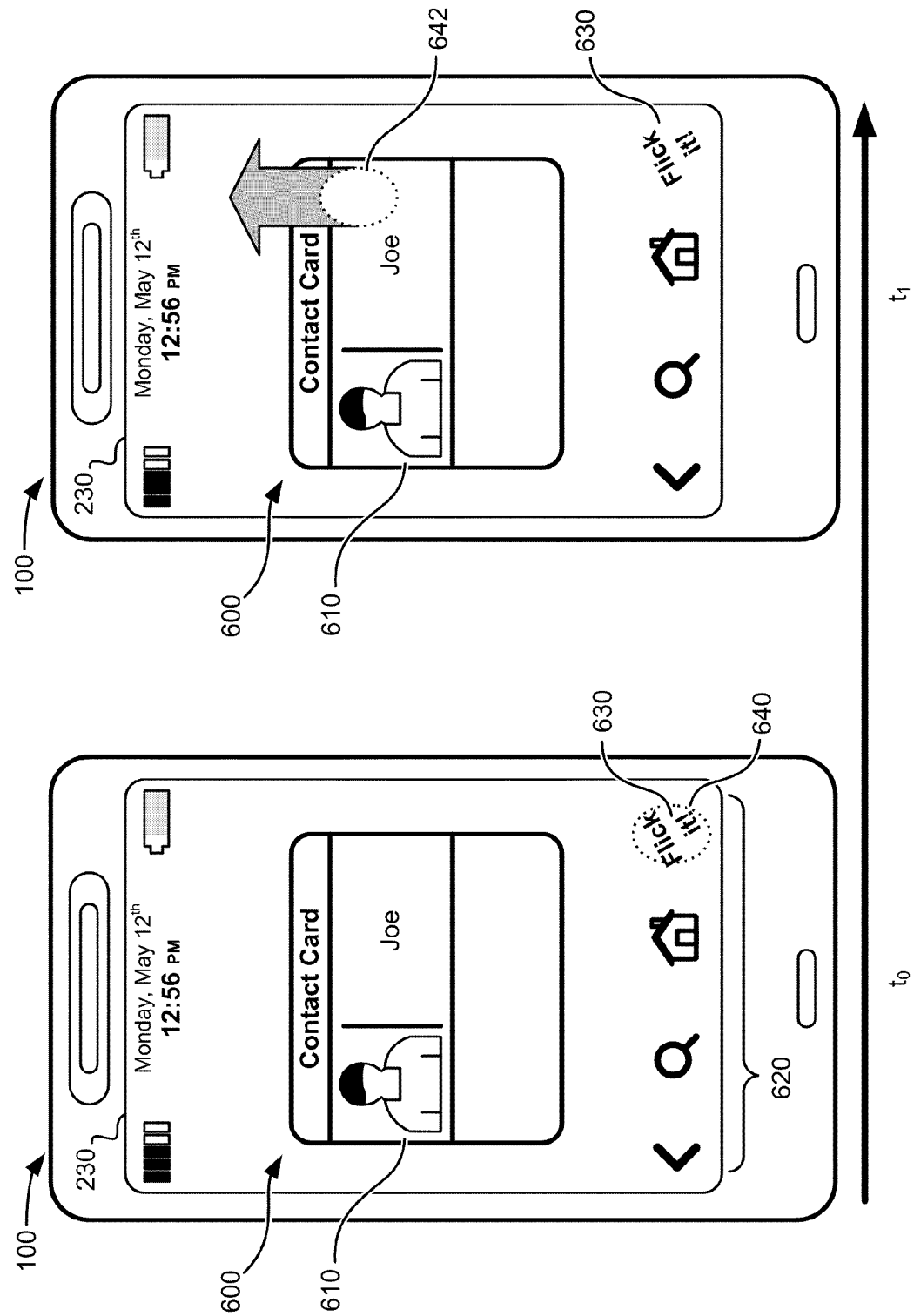
FIGS. 6A and 6B provide examples of operations for initiating gesture-based item delivery according to implementations described herein.
Figure 6B:
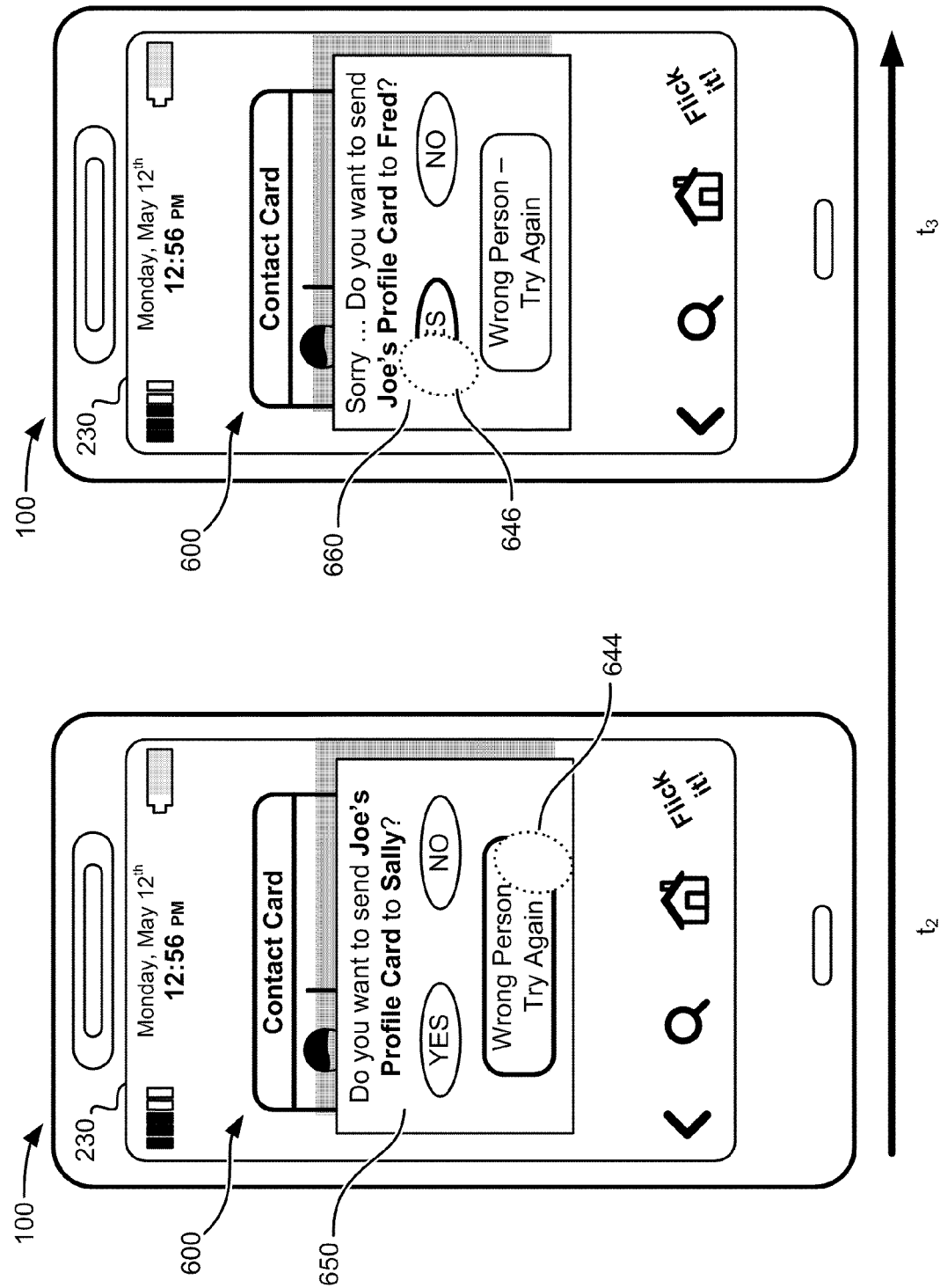

FIGS. 6A and 6B provide examples of operations for initiating gesture-based item delivery capable of being performed by a device, such as device 100. Operations may be performed, for example, using file exchange controller 410, positioning logic 420, and/or interface data 430 operating on processor 300. In an exemplary implementation, gesture-based item delivery may be integrated into one or more applications or operating systems, in contrast with being a stand-alone application. For example, gesture-based item delivery may be integrated into any of an image viewing application, a camera/video recorder application, a gaming application, a file management application, a communications application, or any other type of application where it may be desirable to transfer items. Gesture-based item delivery may be implemented differently depending on the type of application it is associated with and particular user preferences. For simplicity, FIGS. 6A and 6B are described in the context of an application 600 being a contact management program.

In FIGS. 6A and 6B, an exemplary view of application 600 is shown on device 100 as a function of time progressing from time to $t_0$ time $t_3$. Application 600 may present a contact card 610 and may include a set of command icons 620. Command icons 620 may be used to navigate within or out of application 600 and may provide quick access to commonly used features. The displayed command icons 620 may vary depending on actions being performed within application 600. Command icons 620 may include, for example, left/right icons to change between user interface windows, a home button to jump directly to a designated main/home page, a search button to initiate a search, and/or a dialer button to initiate a telephone call. As shown in FIGS. 6A and 6B, command icons 620 may also include a gesture-based delivery button 630. In an exemplary implementation, gesture-based delivery button 630 may be used to enable/disable gesture-based item delivery within application 600. In other implementations, gesture-based item delivery may be activated based on other factors, such as the type of application, the type of objects being displayed, or other contextual factors.

FIG. 6A provides a view of application 600 times $t_0$ and $t_1$. At time $t_0$ of FIG. 6A, a user may provide input 640 (e.g., a touch on display 230) to select gesture-based delivery button 630. The selection of gesture-based delivery button 630 may enable gesture-based item delivery within application 600. At time $t_1$, the user may apply a touch 642 generally to the area of contact card 610 and slide touch 642 forward as indicated in FIG. 6A along the surface of display 230 (e.g., the user may flick a finger along the surface of display 230). The sliding touch 642 may be interpreted by device 100 as a command to initiate gesture-based item delivery of the contact card 610. Based on the command, device 100 may initiate one or more actions to identify the intended recipient device for the contact card 610. Actions to identify the intended recipient device may include, for example, determining a location of device 100, determining an orientation of device 100, determining a direction of sliding touch 642, and/or determining locations of the other recipient devices within the proximity (e.g., within network 510). Actions to determine an intended recipient device for an initiated gesture-based item delivery is described in further detail below with respect to FIGS. 8-10.

FIG. 6B provides a view of application 600 times $t_2$ and $t_3$. At time $t_2$, device 100 may have identified a possible recipient device and may request confirmation from the user. In some implementations, confirmation, from the user, may be requested based on particular factors. In other implementations, no confirmation may be required. Factors that may affect whether a confirmation is needed may include whether information has previously been exchanged with the recipient device, whether multiple devices were identified as possible intended recipients, the type of information being delivered, the application using the gesture-based item delivery, particular user preferences, etc.

As shown in FIG. 6B at time $t_2$, device 100 may identify a device associated with "Sally" as the intended recipient device and request confirmation (e.g., via confirmation window 650 asking "Do you want to send Joe's profile card to Sally?") prior to sending contact card 610. The user may confirm/reject delivery of the contact card to Sally's device by providing input to one of the buttons (e.g., "YES," "NO," or "Wrong Person—Try Again") in confirmation window 650. In the example of FIG. 6B, assume "Sally" was not the intended recipient. Sally may not be the intended recipient because of, for example, a user input error (e.g., sliding touch 642 was inadvertent or sliding touch 642 was in the wrong direction) or a system limitation (e.g., device 100 could not identify a particular recipient with a required degree of certainty). Depending on the reason that "Sally" was not the intended recipient, a user may desire to cancel the gesture-based item delivery (e.g., by pressing "NO") or attempt another delivery to the user's intended recipient (e.g., "Wrong Person—Try Again"). In the example of FIG. 6B, the user may select to attempt another delivery via touch 644.

At time $t_3$, device 100 may identify a device associated with "Fred" as the intended recipient device and request confirmation (e.g., via confirmation window 660 asking "Do you want to send Joe's profile card to Fred?") prior to sending contact card 610. The user may confirm/reject delivery of the contact card to Fred's device by providing input to one of the buttons (e.g., "YES," "NO," or "Wrong Person—Try Again") in confirmation window 650. In the example of FIG. 6B, assume "Fred" was the intended recipient. The user may select "YES" via touch 646 to allow delivery of the contact card.

Figure 7:
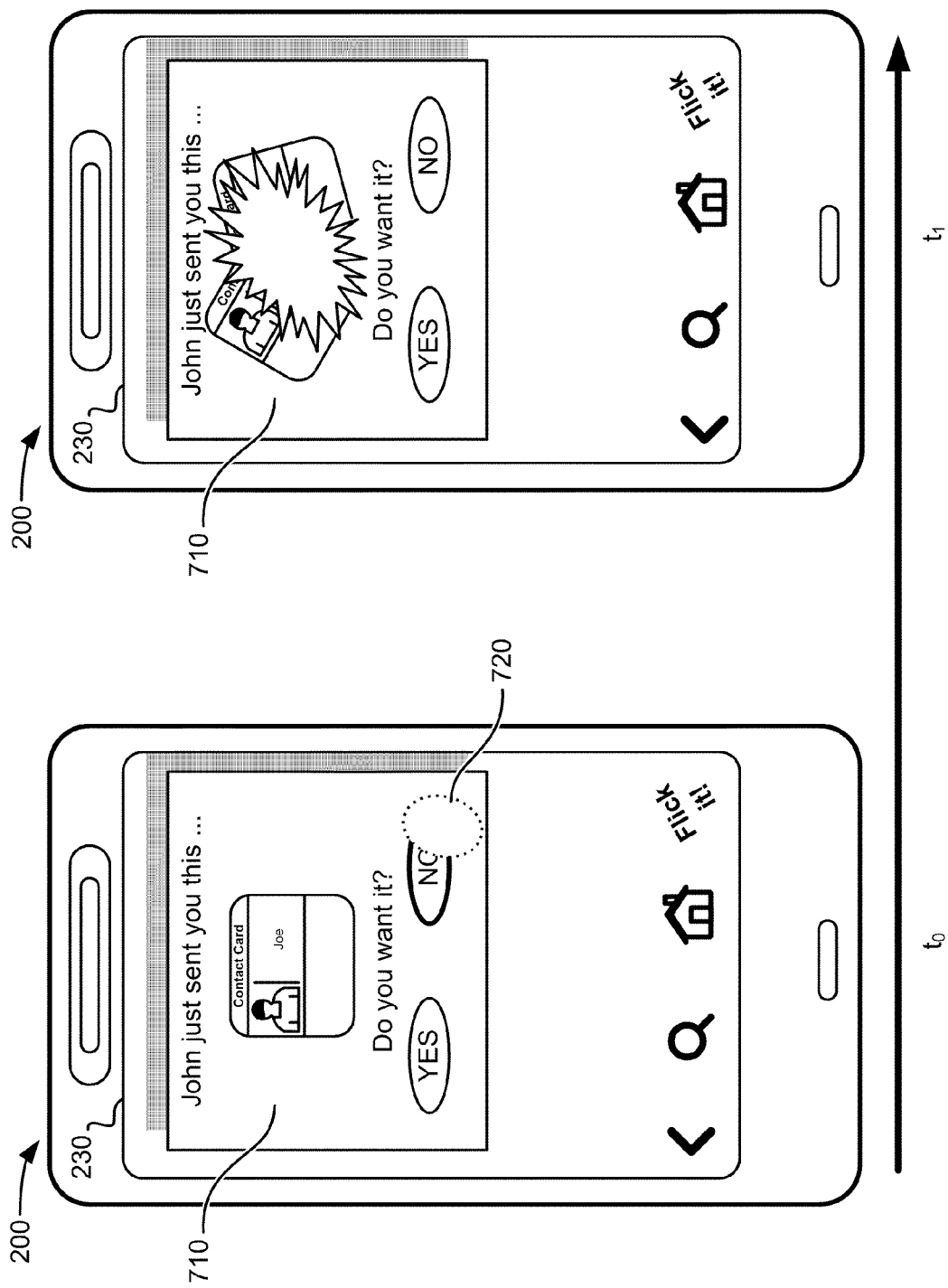
FIG. 7 illustrate exemplary operations for receiving gesture-based item delivery according to implementations described herein.

FIG. 7 provides an example of operations, for receiving gesture-based item delivery, capable of being performed by a device, such as device 100. Operations may be performed for example, using file exchange controller 410 operating on processor 300. FIG. 7 is described in the context of receiving the contact card 610 delivered to "Fred" in FIGS. 6A and 6B.

Prior to time to of FIG. 7, a receiving device 100 may receive the contact card 610 sent from the initiating device 100 in FIGS. 6A and 6B. Receiving device 100 may request confirmation from the user of receiving device 100 to accept the contact card (e.g., confirmation window 710 asking "John just sent you this . . . . Do you want it?"). In some implementations, confirmation, from the user, may be request based on particular factors. In other implementations, no confirmation may be required. Factors that may affect whether a confirmation is needed to accept an item may include whether information has previously been exchanged with the initiating device, the type of information being delivered, whether the initiating device is associated with a known contact, particular user preferences, etc.

As shown in FIG. 7, confirmation window 710 may include a graphic, thumbnail view, description or other information about the received item. The user may confirm/reject receipt of the item (e.g., the contact card 610 from John's device) by providing input to one of the buttons (e.g., "YES" or "NO") in confirmation window 710. In the example of FIG. 7, assume that the user does not want to keep the contact card. At time $t_0$, the user may provide input via touch 720 (e.g., on display 230) to select "NO" to reject the contact card. At time $t_1$ of FIG. 7, receiving device 100 may delete the delivered item (e.g., contact card 610). In an exemplary implementation, device 100 may provide a graphical representation of the deleted item for the user (e.g., image of item blows up, burns, disintegrates, etc.).

Figure 8:
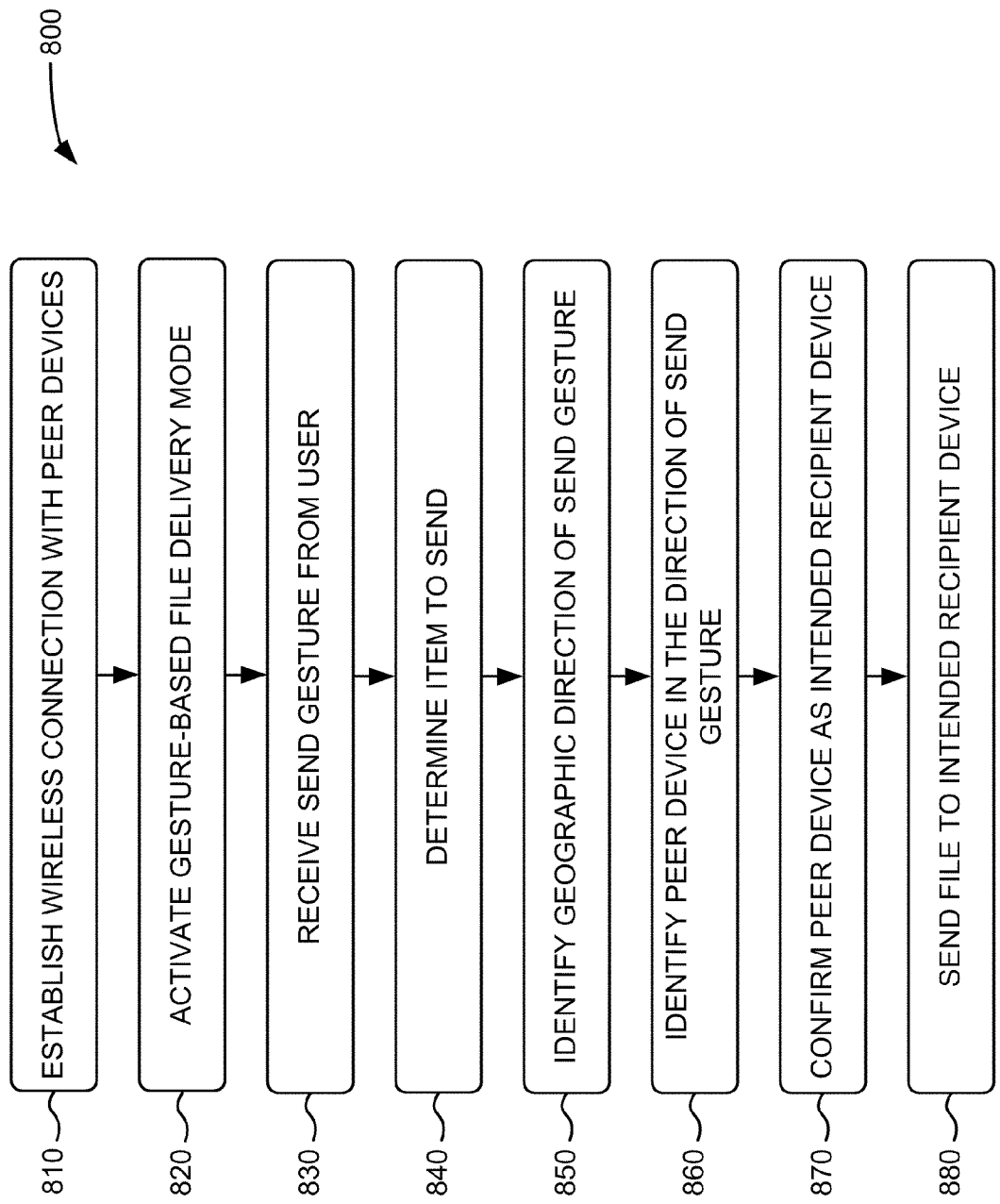
FIGS. 8-10 depict flow charts of an exemplary process for initiating gesture-based item delivery according to implementations described herein.
Figure 9:
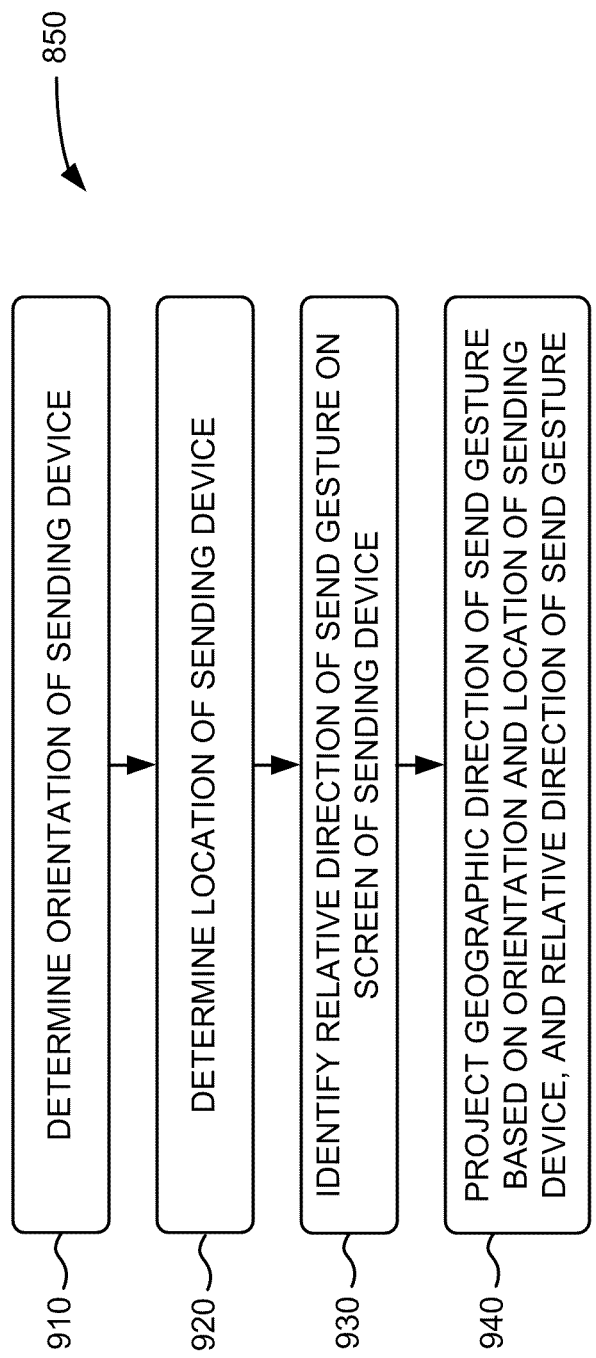
Figure 10:
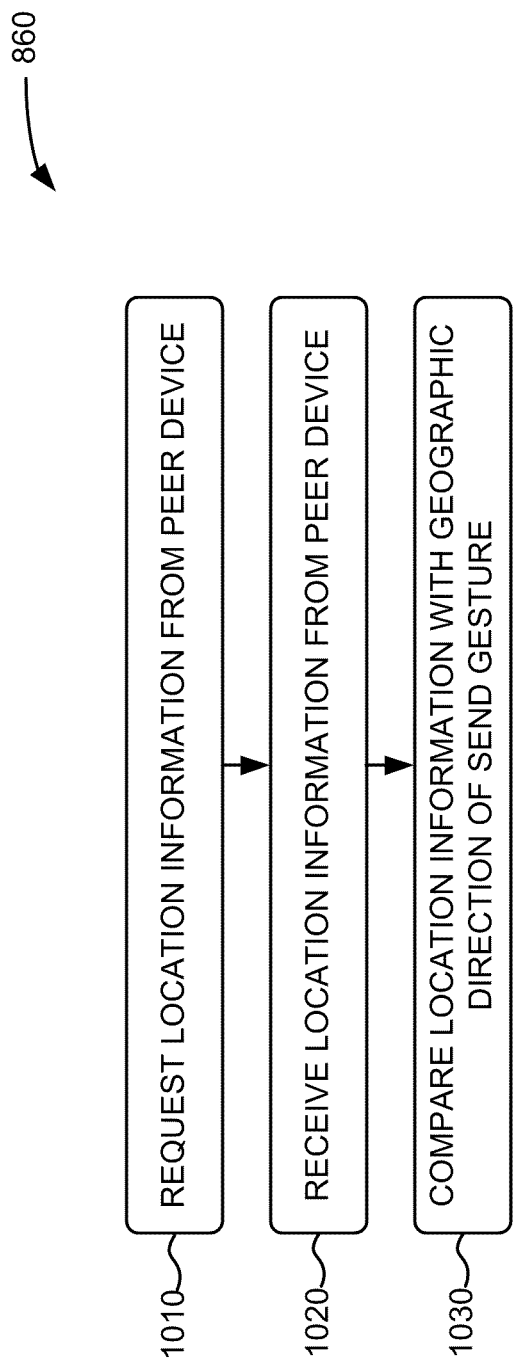

FIGS. 8-10 depict flow charts of an exemplary process 800 for initiating gesture-based item delivery according to implementations described herein. In one implementation, process 800 may be performed by a sending device 100 (e.g., sending device 100-1 of FIG. 1). In another implementation, some or all of process 800 may be performed by another device or a group of devices, including or excluding device 100.

As illustrated in FIG. 8, process 800 may begin by establishing a wireless connection with one or more peer devices (block 810). A peer device may be, for example, any other device 100 within a wireless network (e.g., wireless network 510), such as mobile devices 100 and/or fixed-location devices 100. For example, device 100-1 may establish a wireless connection with one or more other devices 100 to form a local wireless network, such a wireless network 510. In one implementation, device 100-1 may establish the wireless connection using Bluetooth™ protocols. In other implementations, device 100-1 may establish the wireless connection using other wireless protocols. In an exemplary implementation, device 100-1 may use a wireless ad hoc network as a primary option and revert to other wireless networks if a wireless ad hoc network cannot be established.

In one implementation, device 100 may notify a user when a wireless connection is available to support gesture-based item delivery. For example, device 100 may provided a visual (e.g., an icon or pop-up window), audible (e.g., a chime or voice recording), and/or tactile (e.g., vibration) when a user enters a room with one or more devices that are equipped to receive gesture-based item delivery. In another implementation, upon establishing a wireless connection is available to support gesture-based item delivery, device 100 may request (e.g., from DLC 560) a map or other representation of the user's location with respect to other devices 100 within the area of the user.

A gesture-based item delivery mode may be activated (block 820). For example, in one implementation, device 100-1 may receive input from a user to enable gesture-based item delivery from device 100-1. In one implementation, input from the user may be provided by selecting a command button to enable the feature of gesture-based item delivery. In another implementation, the user may be provided a prompt (e.g., a pop-up window) to activate gesture-based item delivery based on, for example, the detected presence of a known contact within wireless network 510. In other implementations, device 100-1 may automatically initiate gesture-based item delivery based on, for example, the type of application incorporating the gesture-based item delivery, the type of objects being displayed on display 230 of device 100-1, detection of previously authorized recipient devices within wireless network, or other contextual factors.

A send gesture may be received from the user (block 830) and the item to send may be determined (block 840). For example, device 100-1 may receive user input on a touch panel (e.g., touch-sensitive display 230) in the form of a sliding touch (e.g., a flick). Device 100-1 may identify the sliding touch as a command to send an item. The item to be sent may be, for example, an image displayed (e.g., on display 230) beneath the starting location of the sliding touch. In another implementation, displayed items that are available to be sent via gesture-based item delivery may be indicated by an overlay (e.g., a semi-transparent overlay), an icon, or another indicator. The user may provide input (e.g., touch) with regard to the overlay, icon, or other indicator to identify the item to be sent via gesture-based item delivery.

The geographic direction of the send gesture may be identified (block 850). Process block 850 may include the process blocks illustrated in FIG. 9. As shown in FIG. 9, process block 850 may include determining the orientation of the sending device (block 910) and determining the location of the sending device (block 920). For example, device 100-1 may determine a directional vector for the send gesture based on a geographical location component (e.g., GPS coordinates) and a direction component (e.g., from a gyroscope/accelerometer and/or compass reading) of device 100-1 to identify where device 100-1 may be pointing at the time of the send gesture. In another implementation, a GNSS may provide sufficiently detailed information to determine both geographic location and direction. In still other implementations, triangulation techniques may be used.

Still referring to FIG. 9, process block 850 may also include identifying the relative direction of the send gesture on the screen of the sending device (930) and projecting a geographic direction of the send gesture based on the orientation and location of the sending device, and the relative direction of the send gesture (block 940). For example, in one implementation, the relative direction of the sliding touch on the screen of device 100-1 may be applied to the directional vector to determine a final geographic direction vector for the send gesture. In another implementation, the direction of sliding touch may be presumed to be in the same direction as the top/front of device 100-1 so that there would be no need to apply the relative direction of the sliding touch to the directional vector.

Returning to FIG. 8, a peer device in the direction of the send gesture may be identified (block 860). Process block 860 may include the process blocks illustrated in FIG. 10. As shown in FIG. 10, process block 860 may include requesting location information from a peer device (block 1010) and receiving location information from the peer device (block 1020). Location information from a peer device may be explicitly requested by device 100-1 in one implementation. In another implementation, location information may be exchanged periodically among devices within the wireless network (e.g., wireless network 510). In still other implementations, fixed-location devices may be included within wireless network 510. Location information for fixed-location devices may be stored, for example, in device 100-1 (e.g., memory 310) or in another location accessible to device 100 via a network. Where a fixed-location device is not equipped with location-determining components, a user may obtain the fixed-location device position by, for example, proximity to device 100-1.

Still referring to FIG. 10, process block 860 may also include comparing the location information with the geographic direction of the send gesture (block 1030). For example, device 100-1 may use the location information from peer devices within network 510 to determine which peer device location may be intersected by the geographic direction vector for the send gesture. In one implementation, device 100-1 may apply a best match algorithm, a particular margin of error, and/or other computational analyses to identify a peer device in the direction of the send gesture. In another implementation, where more than one peer device may be intersected by the geographic direction vector for the send gesture (e.g., multiple devices 100 are in a line along the geographic direction vector), sending device 100-1 may select the closest device as the intended recipient and/or request a confirmation from the user.

Referring again to FIG. 8, the peer device may be confirmed as the intended recipient device (block 870). In one implementation, device 100-1 may request input from the user to confirm that the device identified in process block 860 is the intended recipient of the gesture-based item delivery. User input may be prompted, for example, by a pop-up window, such as windows 650 and 660 of FIG. 6B. In another implementation, confirmation of a peer device may be based on information previously stored in device 100-1. For example, peer devices with previously known device identifications may be deemed pre-authorized by the user. Device 100-1 may store (e.g., in memory 310) device identifications for devices that have previously exchanged items with device 100-1 and/or device identifications for people in the user's contact lists. In still another implementation, a user may set preferences in device 100-1 to not require confirmation of the intended recipient.

The item may be sent to the intended recipient device (block 880). For example, device 100-1 may send the item using appropriate protocols for the wireless network 510. Appropriate protocols may include, for example, receiving a confirmation of receipt from the recipient device.

Figure 11:
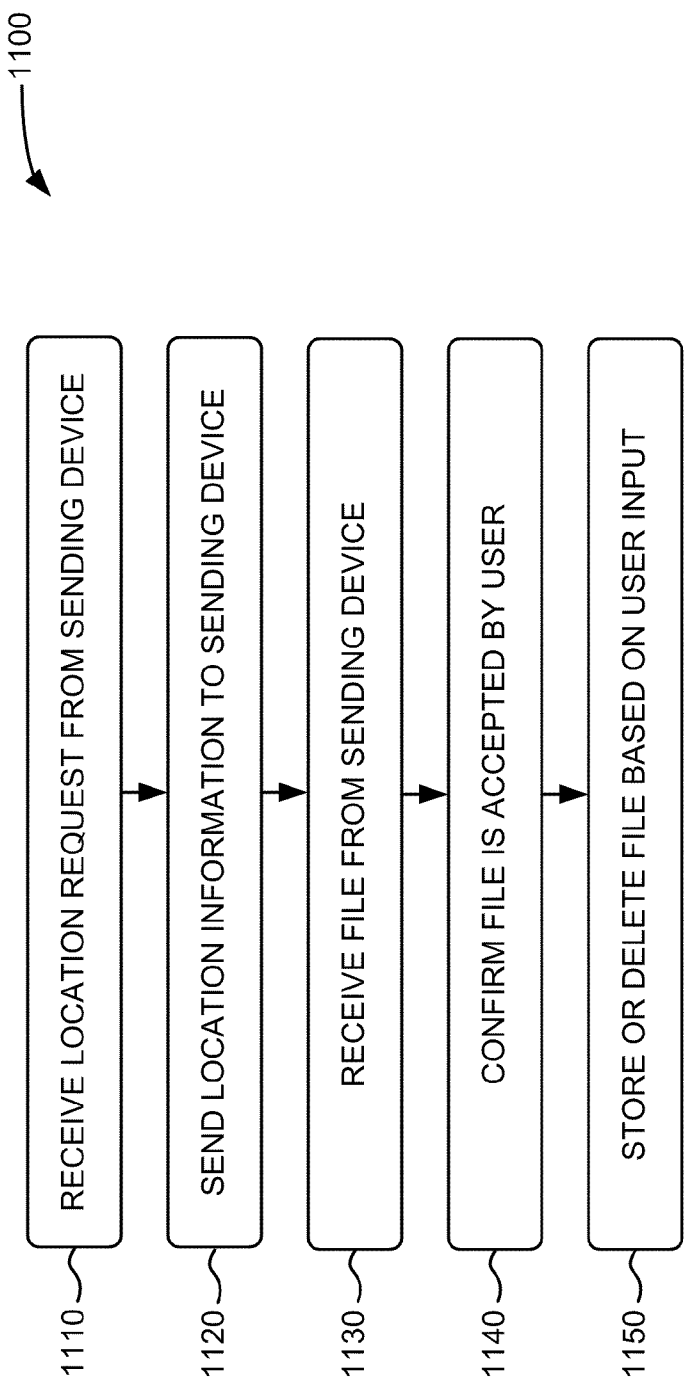
FIG. 11 depicts a flow chart of an exemplary process for receiving gesture-based item delivery according to implementations described herein.

FIG. 11 depicts a flow chart of an exemplary process 1100 for receiving gesture-based item delivery according to implementations described herein. In one implementation, process 1100 may be performed by a receiving device 100 (e.g., receiving device 100-2 of FIG. 1). In another implementation, some or all of process 1100 may be performed by another device or a group of devices, including or excluding device 100.

Process 1100 may begin with receiving a location request from a sending device (block 1110) and sending the requested location information to the sending device. For example, device 100-2 may receive an explicit location request from sending device 100-1 and provide location information in response to the request. In another implementation, the location request may be part of the protocols for the wireless network (e.g., wireless network 510) and device 100-2 may provide periodic updates to the sending device 100-1.

An item may be received from the sending device (block 1130). For example, device 100-2 may receive an item provided from sending device 110-1 via gesture-based item delivery.

It may be confirmed that the item is accepted by the user (block 1140). For example, device 100-2 may present a pop-up window (e.g., window 710) to confirm that a received item can be accepted. In another implementation, confirmation may be based on stored information of, for example, "safe" senders, any known contact, and/or particular file types.

The item may be stored or deleted based on the user input (block 1150). For example, device 100-2 may receive user input to reject a received item and, in response, delete the item from device 100-2. Conversely, device 100-2 may receive user input to accept a received item and, in response, save the item to memory (e.g., memory 310 or networked memory location) of device 100-2. In an implementation, device 110-2 may present sounds and/or graphics corresponding to the storing or deleting actions.

Figure 12:
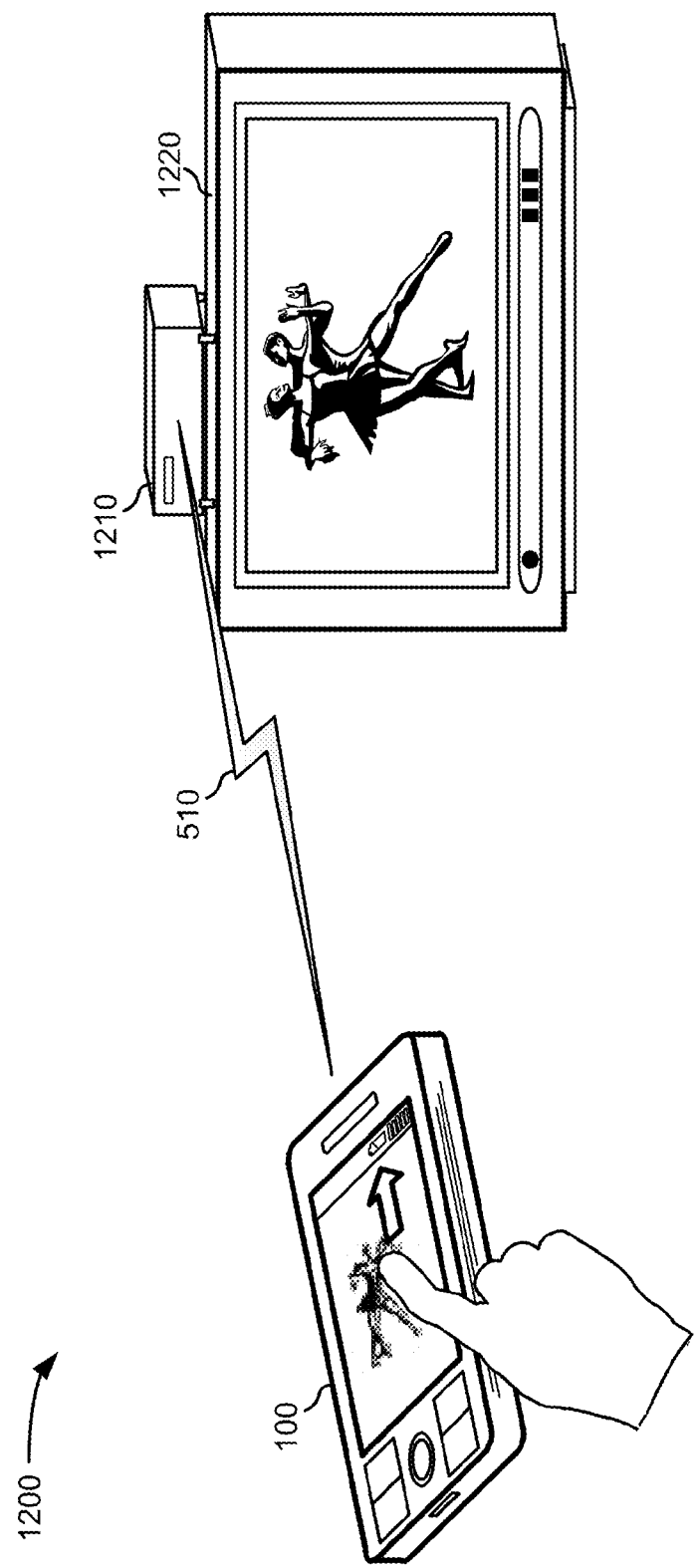
FIG. 12 provides an illustration of exemplary implementation of gesture-based item delivery with a set-top box.

FIG. 12 provides an illustration of exemplary implementation of gesture-based item delivery in a fixed-location environment 1200. As shown in FIG. 12, device 100 and a set-top box 1210 may be joined within a local wireless network 510, such as, for example, a network using Bluetooth™ wireless protocols, other UWB communications, infrared technology, etc. Set-top box 1210 may also connect to a display, such as television 1220, via wired or wireless connections. In an exemplary implementation, set-top box 1210 may receive items over wireless network and present the received items on television 1220. Received items may include multimedia files (e.g., images, videos, audio, etc.) or other items.

In the implementation of FIG. 12, set-top box 1210 may be considered a fixed-location device. Prior to enabling gesture-based item delivery to set-top box 1210, device 100 (e.g., positioning logic 420) may prompt the user to establish location information for set-top box 1210. Location information for set-top box 1210 may be determined, for example, by placing device 100 on or near set-top box 1210 so that device 100 may associate its own GPS coordinates (or other geographical position information) with that of set-top box 1210. Device 100 may store the coordinates for use during future gesture-based item delivery.

As shown in FIG. 12, a touch gesture (e.g., a "flick") on the surface of device 100 may be used to initiate sending an item (e.g., a picture) from device 100 to set-top box 1210. Set-top box 1210 may receive the item and present the item on television 1220. Set-top box 1210 may also implement security protocols (e.g., set-top box 1210 may only accept gesture-based item delivery from previously identified devices) and provide confirmation signals to as appropriate set-top box 1210. In an exemplary implementation, gesture-based item delivery may be directed to set-top box 1210, but may not be originated by set-top box 1210.

Although the configuration of FIG. 12 shows exemplary components of fixed-location environment 1200, in other implementations, fewer, different, differently arranged, or additional components may be used. For example, while fixed-location environment 1200 has been described in the context of a device 100 and a set-top box/television system, in other implementations, the fixed-location device may be a computer with a display, a printer, an audio device (e.g., a stereo system), a gaming console/display, etc.

Figure 13:
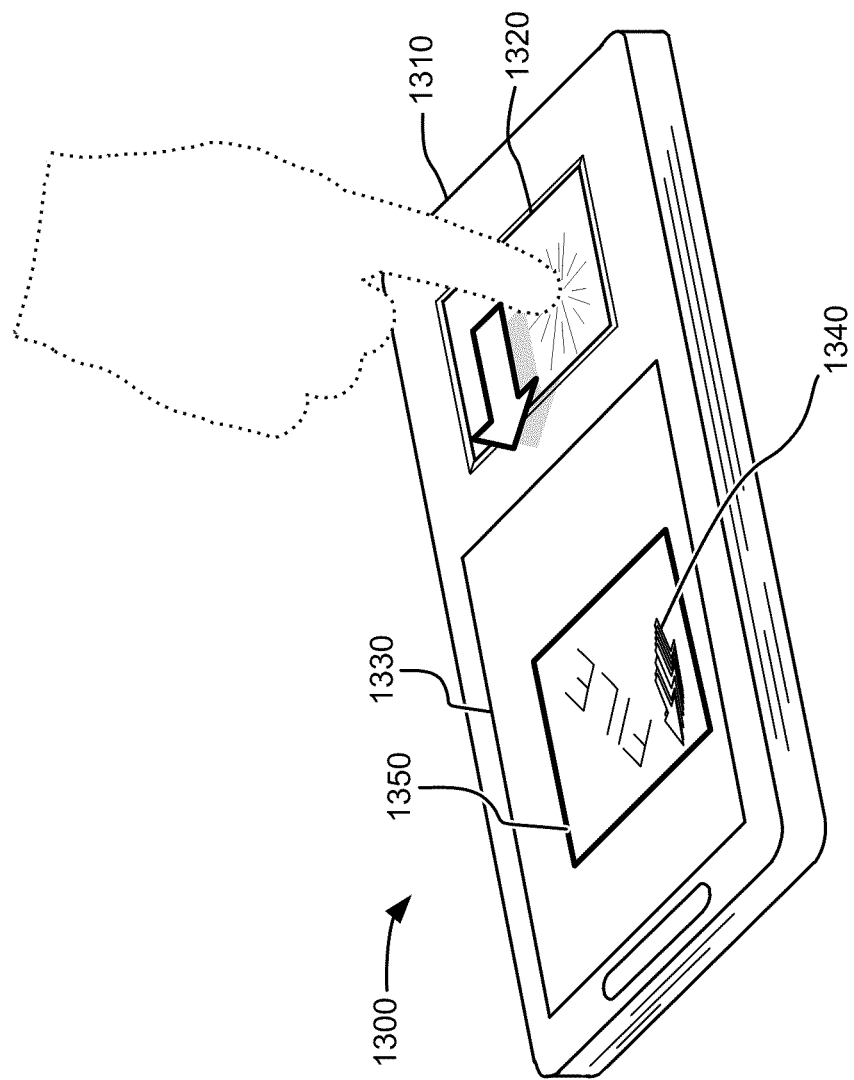
FIG. 13 provides an illustration of an exemplary implementation of gesture-based item delivery on a mobile device.

FIG. 13 provides an illustration of an exemplary implementation of user input for gesture-based item delivery on a device 1300 with a touch panel separate from a display. Device 1300 may include housing 1310, touch panel 1320, and display 1330. Other components, such as control buttons, a keypad, a microphone, a camera, connectivity ports, memory slots, and/or speakers, may be located on device 1300, including, for example, on a rear or side panel of housing 1310. Although FIG. 13 shows exemplary components of device 1300, in other implementations, device 1300 may contain fewer, different, differently arranged, or additional components than depicted in FIG. 13.

FIG. 13 illustrates touch panel 1320 being separately located from display 1330 on housing 1310. Touch panel 1320 may include any resistive touch panel technology or other technology providing the ability to register a set of touch coordinates. User input on touch panel 1320 may be associated with display 1330 by, for example, movement and location of a cursor 1340. User input on touch panel 1320 may be in the form of the touch of nearly any object, such as a body part (e.g., a finger, as shown) or a pointing device (e.g., a stylus, pen, etc.).

Touch panel 1320 may be operatively connected with display 1330 to allow the combination of touch panel 1320 and display 1330 to be used as an input device. Touch panel 1320 may include the ability to identify movement of an object as the object moves on the surface of touch panel 1320. As described above with respect to, for example, FIG. 6A, a sliding touch gesture may be used to initiate a gesture-based item delivery. In the implementation of FIG. 13, the touch on touch panel 1320 may correspond to the sliding touch gesture 642 on touch-sensitive display 230. Cursor 1340 may be used to select a particular item 1350 that can be sent via the gesture-based item delivery.

Systems and/or methods described herein may display an item on a display of a computing device and establish a wireless connection with other devices. The computing device may receive an input gesture (e.g., a flicking motion) on a touch panel of the computing device that indicates a direction, and the computing device may determine a geographic direction of the input gesture. The computing device also may identify one of the other devices in line with the geographic direction and may send a copy of the item, on the display, to the identified device. Thus, systems and/or methods described herein may provide an intuitive user interface for sharing information that resembles typical human interactions with physical items.

The foregoing description of implementations provides illustration and description, but is not intended to be exhaustive or to limit the invention to the precise form disclosed. Modifications and variations are possible in light of the above teachings or may be acquired from practice of the invention.

For example, while implementations have been described primarily in the context of a mobile device (such as a radiotelephone, a PCS terminal, or a PDA), in other implementations the systems and/or methods described herein may be implemented on other computing devices such as a remote control, a laptop computer, a tablet computer, an ultra-mobile personal computer, or a portable gaming system.

Also, while series of blocks have been described with regard to FIGS. 8-11, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method comprising:
  displaying, by a computing device, an item on a display of the computing device;
  establishing, by the computing device, a wireless connection with one or more of a plurality of devices;

receiving, by the computing device, information regarding an input gesture that includes sliding an object along a surface of the display;

determining a directional vector for the input gesture, identifying a relative direction of the input gesture on the display, determining, by the computing device, a geographic direction associated with the input gesture by applying the relative direction to the directional vector;

determining, by the computing device, that two or more devices, of the plurality of devices, are in line with the geographic direction;

selecting, by the computing device, a particular device, of the two or more devices, that is in line with the geographic direction; and sending, by the computing device, a copy of data associated with the item from the computing device to the particular device that is in line with the geographic direction.

2. The method of claim 1, further comprising:
associating the item, on the display, with the input gesture.

3. The method of claim 1, further comprising:
determining, prior to sending the copy of the data, whether another item has previously been transmitted from the computing device to the particular device; and
confirming, with a user of the computing device, that the particular device is an intended device to receive the item when the other item has not previously been transmitted from the computing device to the particular device.

4. The method of claim 1, where determining the directional vector for the input gesture comprises:
determining an orientation of the computing device,
determining a location of the computing device, and
determining the directional vector for the input gesture based on at least one of the orientation of the computing device or the location of the computing device.

5. The method of claim 1, where identifying the particular device comprises:
obtaining location information for the two or more devices,
comparing the location information with the geographic direction associated with the input gesture,
determining that the particular device is located closer to the computing device relative to other devices of the two or more devices, and
identifying the particular device based on the particular device being located closer to the computing device relative to the other devices of the two or more devices.

6. The method of claim 1, where establishing the wireless connection includes:
notifying a user of the computing device that a wireless network is available to support establishing the wireless connection with the one or more of the plurality of devices.

7. The method of claim 1, where the item is one of an image file, an audio file, a video file, a text file, or a link to another item.

8. The method of claim 1, where the particular device comprises:
a set-top box,
a printer, or
a personal computer.

9. The method of claim 1, where the computing device comprises:
a radiotelephone,
a personal communications system (PCS) terminal, or
a personal digital assistant (PDA).

10. The method of claim 1,
where the particular device comprises:
a radiotelephone,
a personal communications system (PCS) terminal, or
a personal digital assistant (PDA), and
where the method further comprises:
receiving another item from the particular device; and
presenting, via the display, a graphical representation of the other item based on receiving the other item from the particular device.

11. A device comprising:
a processor; and
a memory storing a plurality of instructions that, when executed by the processor, cause the processor to:
establish a wireless connection with a plurality of devices,
provide an item for display,
the item comprising a graphical representation of data,
receive information regarding an input gesture that includes sliding an object along a surface of a display,
determine a directional vector for the input gesture,
identify a relative direction of the input gesture on the display,
determine a geographic direction of the input gesture by applying the relative direction to the directional vector,
determine that two or more devices, of the plurality of devices, are in line with the geographic direction,
select a particular device, of the two or more devices, that is in line with the geographic direction, and
send a copy of the data to the particular device that is in line with the geographic direction.

12. The device of claim 11, where, when determining the directional vector for the input gesture, the processor is to:
determine an orientation of the device,
determine a location of the device, and
determine directional vector for the input gesture based on at least one of the orientation or the location.

13. The device of claim 11, where, when determining that the two or more devices are in line with the geographic direction, the processor is to:
obtain location information for the two or more devices, and
determine that the two or more devices are in line with the geographic direction by comparing the location information with the geographic direction of the input gesture.

14. The device of claim 11, where the particular device that is in line with the geographic direction comprises:
a radiotelephone,
a personal communications system (PCS) terminal, or
a personal digital assistant (PDA).

15. The device of claim 11, where the particular device that is in line with the geographic direction comprises a fixed-location device.

16. The device of claim 11, where, when selecting the particular device, the processor is to:
cause a message to be provided for display,
the message identifying each of the two or more devices that are in line with the geographic direction,
receive an input after causing the message to be displayed, and
select the particular device based on the input.

17. A non-transitory computer-readable medium storing instructions, the instructions comprising:

one or more instructions that, when executed by at least one processor, cause the at least one processor to:
- establish a wireless connection with one or more of a plurality of devices;
- provide, for presentation, an item;
- receive information regarding an input gesture that includes sliding an object along a surface of a display;
- determine a directional vector for the input gesture;
- identify a relative direction of the input gesture on the display;
- determine a geographic direction by applying the relative direction to the directional vector;
- determine two or more devices, of the plurality of devices, that are in line with the geographic direction;
- select a particular device, of the two or more devices, that is in line with the geographic direction; and
- send a copy of data represented by the item to the particular device that is in line with the geographic direction.

18. The non-transitory computer-readable medium of claim 17, where the one or more instructions to select the particular device include:
one or more instructions that, when executed by the at least one processor, cause the at least one processor to:
- determine that the particular device is located closer to the at least one processor than any other device of the two or more devices, and
- select the particular device based on the particular device being located closer to the at least one processor than any other device of the two or more devices.

19. The non-transitory computer-readable medium of claim 17, where the instructions further comprise:
one or more instructions that, when executed by the at least one processor, cause the at least one processor to:
- request, after selecting the particular device, confirmation that the particular device is an intended recipient of the copy of the data represented by the item, and
- receive the confirmation before sending the copy of the data to the particular device.

20. The non-transitory computer-readable medium of claim 17, where the one or more instructions to determine the directional vector for the input gesture include:
one or more instructions that, when executed by the at least one processor, cause the at least one processor to:
- determine a location component associated with the at least one processor,
- determine a direction component associated with the at least one processor, and
- determine the directional vector for the input gesture based on at least one of the location component or the direction component.

* * * * *